United States Patent
Jung et al.

(10) Patent No.: US 12,445,752 B2
(45) Date of Patent: Oct. 14, 2025

(54) IMAGE SENSOR DEVICE AND OPERATION METHOD THEREOF

(71) Applicant: SAMSUNG ELECTRONICS CO., LTD., Suwon-si (KR)

(72) Inventors: Yooseung Jung, Suwon-si (KR); Seokyong Hong, Suwon-si (KR); Jahyun Koo, Suwon-si (KR); Junyoung Kil, Suwon-si (KR); Dahsom Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 76 days.

(21) Appl. No.: 18/383,070

(22) Filed: Oct. 24, 2023

(65) Prior Publication Data
US 2024/0365026 A1 Oct. 31, 2024

(30) Foreign Application Priority Data
Apr. 28, 2023 (KR) ........................ 10-2023-0055854

(51) Int. Cl.
| | |
|---|---|
| H04N 25/78 | (2023.01) |
| H04N 25/59 | (2023.01) |
| H04N 25/709 | (2023.01) |
| H04N 25/76 | (2023.01) |
| H04N 25/766 | (2023.01) |
| H04N 25/77 | (2023.01) |
| H04N 25/772 | (2023.01) |
| H04N 25/79 | (2023.01) |

(52) U.S. Cl.
CPC ........... *H04N 25/78* (2023.01); *H04N 25/709* (2023.01); *H04N 25/77* (2023.01); *H04N 25/7795* (2023.01)

(58) Field of Classification Search
CPC .. H04N 25/78; H04N 25/709; H04N 25/7795; H04N 25/77; H04N 25/59; H04N 25/772; H04N 25/79; H04N 25/766
See application file for complete search history.

(56) References Cited

U.S. PATENT DOCUMENTS

| | | |
|---|---|---|
| 6,218,656 B1 | 4/2001 | Guidash |
| 7,512,021 B2 | 3/2009 | Houda et al. |
| 7,948,533 B2 | 5/2011 | Koseki |

(Continued)

FOREIGN PATENT DOCUMENTS

| | | |
|---|---|---|
| JP | 4073654 B2 | 4/2008 |
| JP | 6760079 B2 | 9/2020 |

(Continued)

*Primary Examiner* — Marly S Camargo
(74) *Attorney, Agent, or Firm* — Fish & Richardson P.C.

(57) ABSTRACT

An image sensor device includes a first pixel located at a first row, a first select transistor, a second pixel located at a second row, a second select transistor, the second row being different from the first row, and a column line connected to both the first pixel and the second pixel, and during a first time period, a floating diffusion node of the first pixel is reset, and during a second time period, the second select transistor is turned on, and a first voltage is applied to the column line through the second select transistor, the second time period is included in the first time period, and the first voltage is determined based on a voltage of a reset floating diffusion node of the second pixel.

20 Claims, 10 Drawing Sheets

(56) References Cited

U.S. PATENT DOCUMENTS

| | | |
|---|---|---|
| 9,083,845 B2 | 7/2015 | Gray |
| 9,083,902 B2 * | 7/2015 | Masagaki ............ H04N 25/531 |
| 9,888,200 B2 * | 2/2018 | Hsu ...................... H04N 25/707 |
| 2009/0053848 A1 * | 2/2009 | Fan ....................... H10F 39/803 |
| | | 438/59 |
| 2015/0077605 A1 * | 3/2015 | Takada ................... H04N 25/78 |
| | | 348/300 |
| 2016/0366357 A1 | 12/2016 | Shin |
| 2019/0297293 A1 | 9/2019 | Matsumoto et al. |
| 2021/0337155 A1 | 10/2021 | Chu et al. |
| 2022/0272290 A1 | 8/2022 | Ramakrishnan |
| 2022/0286637 A1 | 9/2022 | Park et al. |
| 2023/0217129 A1 * | 7/2023 | Bae ...................... H04N 25/627 |
| 2024/0178242 A1 * | 5/2024 | Kim ....................... H04N 25/78 |

FOREIGN PATENT DOCUMENTS

| | | |
|---|---|---|
| KR | 10-2307376 B1 | 10/2021 |
| KR | 10-2021-0131795 A | 11/2021 |
| KR | 10-2022-0125025 A | 9/2022 |

\* cited by examiner

IMAGE SENSOR DEVICE AND OPERATION METHOD THEREOF

CROSS-REFERENCE TO RELATED APPLICATIONS

This application claims priority under 35 U.S.C. § 119 to Korean Patent Application No. 10-2023-0055854 filed on Apr. 28, 2023, in the Korean Intellectual Property Office, the disclosures of which are incorporated by reference herein in their entireties.

BACKGROUND

1. Field

Embodiments of the present disclosure described herein relate to an image sensor, and more particularly, relate to an image sensor device and an operation method thereof.

2. Description of the Related Art

An image sensor includes a charge coupled device (CCD) image sensor, a complementary metal-oxide semiconductor (CMOS) image sensor (CIS), etc. The CMOS image sensor includes pixels composed of CMOS transistors and converts light energy into an electrical signal by using a photoelectric conversion element included in each pixel. The CMOS image sensor obtains information about a captured/photographed image by using the electrical signal generated by each pixel.

In particular, nowadays, a high frame rate (HFR) technology for providing a pixel value at high speed is required in the CMOS image sensor field. To implement the high-speed operation of the image sensor, it is important to decrease a settling time of a column line in a correlated double sampling (CDS) operation and an analog-to-digital conversion (ADC) operation.

SUMMARY

Embodiments of the present disclosure provide an image sensor device with improved performance and an operation method thereof.

According to an embodiment, an image sensor device includes a first pixel located at a first row and comprising a first select transistor, a second pixel located at a second row and comprising a second select transistor, the second row is different from the first row, and a column line connected to the first pixel and the second pixel. During a first time period, a floating diffusion node of the first pixel is reset. During a second time period, the second select transistor is turned on, and a first voltage is applied to the column line through the second select transistor, the second time period being included in the first time period. The first voltage is determined based on a voltage of a floating diffusion node which has been reset of the second pixel.

According to an embodiment, an image sensor device includes a pixel array that includes a first pixel located at a first row and including a first reset transistor and a first select transistor, a second pixel located at a second row different from the first row and including a second select transistor, and a column line connected to the first pixel and the second pixel, a row driver that generates control signals controlling each of the first and second rows of the pixel array respectively so as to be provided to the first pixel and the second pixel, and a timing controller that controls the row driver. During a first time period, based on the control signals, the first reset transistor is turned on, and the first select transistor is turned off. During a second time period included in the first time period, based on the control signals the second select transistor is turned on, a first voltage is applied to the column line through the second select transistor, and the first voltage is determined based on a voltage of a floating diffusion node which has been reset of the second pixel.

According to an embodiment, an operation method of an image sensor device includes turning on a first reset transistor of a first pixel located at a first row and a second reset transistor of a second pixel located at a second row such that a floating diffusion node of the first pixel and a floating diffusion node of the second pixel are reset, applying a first voltage to a column line, which are connected to both the first pixel and the second pixel, through the second select transistor by turning off the second reset transistor and turning on the second select transistor, and comparing a first pixel signal output from the first pixel with a ramp signal after turning off the second select transistor and turning on the first select transistor, the first voltage being determined based on a voltage of the floating diffusion node which has been reset of the second pixel.

BRIEF DESCRIPTION OF THE FIGURES

Features will become apparent to those of skill in the art by describing in detail exemplary embodiments with reference to the attached drawings in which.

The above and other objects and features of the present disclosure will become apparent by describing in detail embodiments thereof with reference to the accompanying drawings.

DETAILED DESCRIPTION

Below, embodiments of the present disclosure will be described in detail and clearly to such an extent that one skilled in the art easily carries out the present disclosure.

In the detailed description, components described with reference to the terms "part", "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
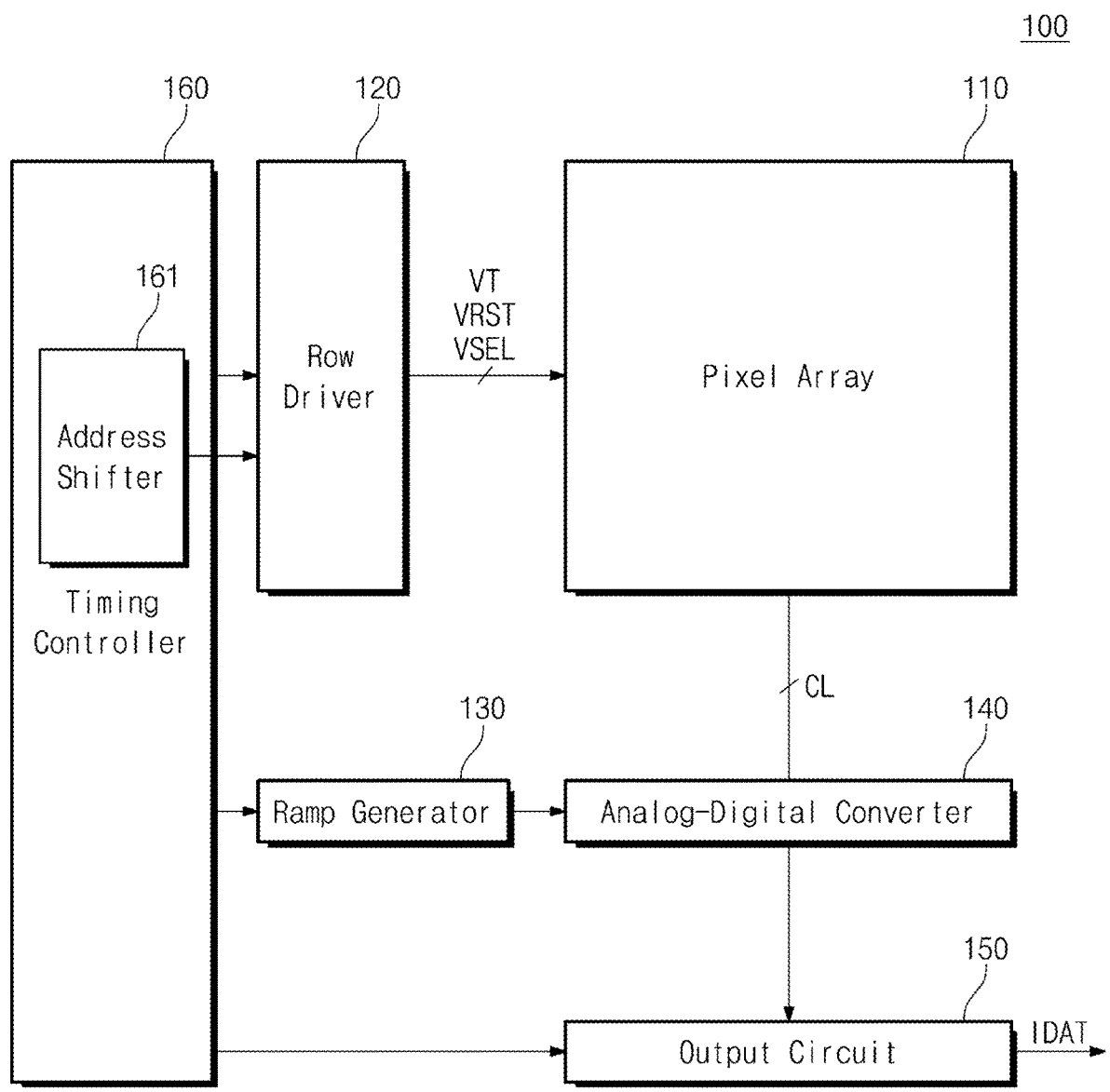
FIG. 1 is a block diagram illustrating an image sensor device according to an embodiment of the present disclosure.

FIG. 1 is a block diagram illustrating an image sensor device according to an embodiment of the present disclosure. An image sensor device 100 may include a pixel array 110, a row driver 120, a ramp generator 130, an analog-to-digital converter 140, an output circuit 150, and a timing controller 160.

The pixel array 110 may include a plurality of image pixels (hereinafter referred to as "pixels") arranged in a row direction and a column direction. Each of the plurality of pixels may generate a pixel signal under control of the row driver 120. The plurality of pixels may output the generated pixel signals through column lines CL.

The row driver 120 may select and drive a row of the pixel array 110. The row driver 120 may decode addresses generated by the timing controller 160 and may generate control signals for selecting and driving a row of the pixel array 110. For example, the control signals may include a selection signal VSEL for selecting a pixel, a reset signal VRST for resetting a floating diffusion node, etc. The row driver 120 may include latch circuits for storing the addresses and logic circuits for providing the control signals to the pixel array 110.

The ramp generator 130 may generate a ramp signal RAMP (refer to FIG. 2) under control of the timing controller 160. For example, the ramp generator 130 may operate in response to a control signal such as a ramp enable signal. When the ramp enable signal is activated, the ramp generator 130 may generate the ramp signal RAMP depending on preset values (e.g., a start level, an end level, and a slope). In other words, the ramp signal RAMP may be a signal that increases or decreases along a preset slope during a specific time. The ramp signal RAMP may be provided to the analog-to-digital converter 140.

The analog-to-digital converter 140 may receive column output signals through the column lines CL from the plurality of pixels from the pixel array 110 and may receive the ramp signal RAMP from the ramp generator 130. The analog-to-digital converter 140 may operate based on a correlated double sampling (CDS) technique for obtaining a reset signal and an image signal from the received column output signal and extracting a difference between the reset signal and the image signal as an effective signal component. For example, the analog-to-digital converter 140 may include a plurality of comparators and a plurality of counters.

The output circuit 150 may receive digital signals from the analog-to-digital converter 140. The output circuit 150 may combine the received digital signals and may output final image data IDAT.

The timing controller 160 may generate an address, a control signal, and/or a clock to control an operation and/or a timing of each of the row driver 120, the ramp generator 130, the analog-to-digital converter 140, and the output circuit 150.

In addition, the timing controller 160 may include an address shifter 161 for performing an operation where voltages of the column lines CL are adjusted by the pixel array 110. In detail, the address shifter 161 may determine an address of a pixel adjacent to a pixel, which is generating a read pixel signal, and may provide the determined address to the row driver 120.

In an embodiment, the pixel array 110 may adjust voltages of the column lines CL under control of the row driver 120 and the timing controller 160. For example, a voltage of a column line connected to a first pixel that is generating a pixel signal may be adjusted based on an operation of a second pixel that is located at a row adjacent to the first pixel, does not generate a pixel signal, and is connected to the same column line as the first pixel.

Figure 2:
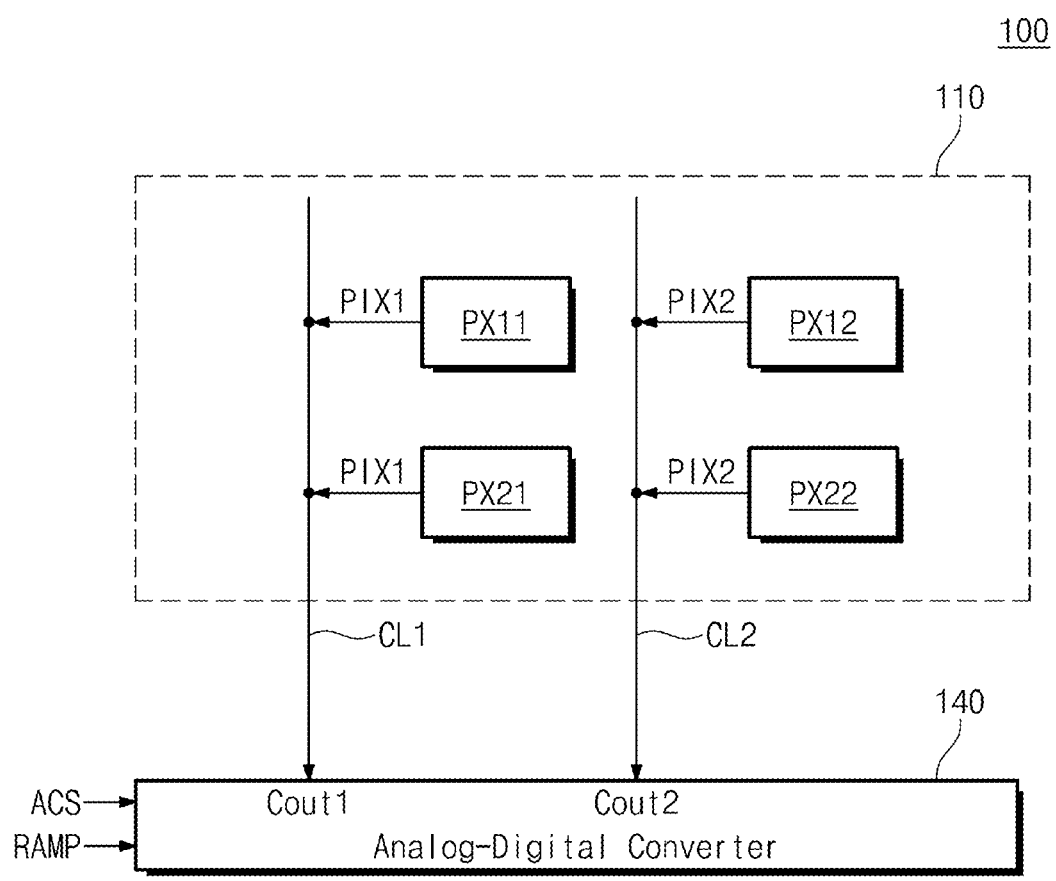
FIG. 2 is a block diagram illustrating a partial configuration of an image sensor device of FIG. 1 in detail.

FIG. 2 is a diagram illustrating a partial configuration of an image sensor device of FIG. 1. For brevity of drawing and for convenience of description, a partial configuration of the image sensor device 100 is illustrated, but the present disclosure is not limited thereto. Also, an example in which a plurality of pixels PX11 to PX22 of the pixel array 110 are disposed at the first and second rows and the first and second columns is illustrated, but the present disclosure is not limited thereto. For example, a plurality of pixels of the pixel array 110 may be expanded in the row direction and the column direction, and thus, pixels may be further included in the pixel array 110.

Referring to FIGS. 1 and 2, the image sensor device 100 may include the pixel array 110 and the analog-to-digital converter 140. The pixel array 110 may include the plurality of pixels PX11 to PX22. The pixels PX11 and PX21 located at the first column from among the plurality of pixels PX11 to PX22 may be connected to a first column line CL1, and the pixels PX12 and PX22 located at the second column from among the plurality of pixels PX11 to PX22 may be connected to a second column line CL2.

In an embodiment, the pixel array 110 may include various forms of color filter arrays. For example, the pixel array 110 may include a color filter array configured to allow each pixel to receive a light signal corresponding to a preset color. In an embodiment, the color filter array may include at least one of various color filter array patterns such as a Bayer pattern, an RGBE pattern, a CYYM pattern, a CYGM pattern, a BGBW Bayer pattern, a BGBW pattern, and a tetra pattern.

The plurality of pixels PX11 to PX22 may generate first and second pixel signals PIX1 and PIX2. For example, the pixels PX11 and PX21 connected to the first column line CL1 from among the plurality of pixels PX11 to PX22 may generate the first pixel signals PIX1, and the pixels PX12 and PX22 connected to the second column line CL2 from among the plurality of pixels PX11 to PX22 may generate the second pixel signals PIX2.

The plurality of pixels PX11 to PX22 may output the first and second pixel signals PIX1 and PIX2 to the first and second column lines CL1 and CL2 in response to the selection signal VSEL.

In an embodiment, the voltage of each of the first and second pixel signals PIX1 and PIX2 may be the reset voltage generated through the reset operation of the corresponding pixel or the data voltage generated through the shutter operation.

The column lines CL1 and CL2 may output column output signals Cout1 and Cout2 to the analog-to-digital converter 140. The voltages of the column output signals Cout1 and Cout2 may be determined based on the voltages of the pixel signals PIX1 and PIX2. For example, when the reset sampling operation is performed, the voltages of the column output signals Cout1 and Cout2 may be the reset voltages. For example, when the data sampling operation is performed, the voltages of the column output signals Cout1 and Cout2 may be the data voltages.

The analog-to-digital converter 140 may be connected to the first and second column lines CL1 and CL2. The analog-to-digital converter 140 may receive the first and second column output signals Cout1 and Cout2 from the first and second column lines CL1 and CL2, respectively. The analog-to-digital converter 140 may receive the ramp signal RAMP from the ramp generator 130.

The analog-to-digital converter 140 may sample the first and second column output signals Cout1 and Cout2 in response to a control signal ACS from the timing controller 160 (i.e., may perform digital signal conversion thereon).

In detail, the analog-to-digital converter 140 may perform the reset sampling operation and the data sampling operation in response to the control signal ACS from the timing controller 160. The analog-to-digital converter 140 may obtain a reset sampling voltage through the reset sampling operation and may obtain a data sampling voltage through the data sampling operation.

The reset sampling voltage may refer to a voltage of the column output signal Cout1/Cout2, which is equal to the voltage of the ramp signal RAMP after the reset operation is performed. The data sampling voltage may refer to a voltage of the column output signal Cout1/Cout2, which is equal to the voltage of the ramp signal RAMP after the shutter operation is performed. The analog-to-digital converter 140 may generate a digital signal for an image based on a difference between the data sampling voltage and the reset sampling voltage.

For example, the analog-to-digital converter 140 may generate the digital signal including information indicating that the intensity of light input to the image sensor device 100 is stronger as the difference between the data sampling voltage and the reset sampling voltage is greater.

Figure 3:
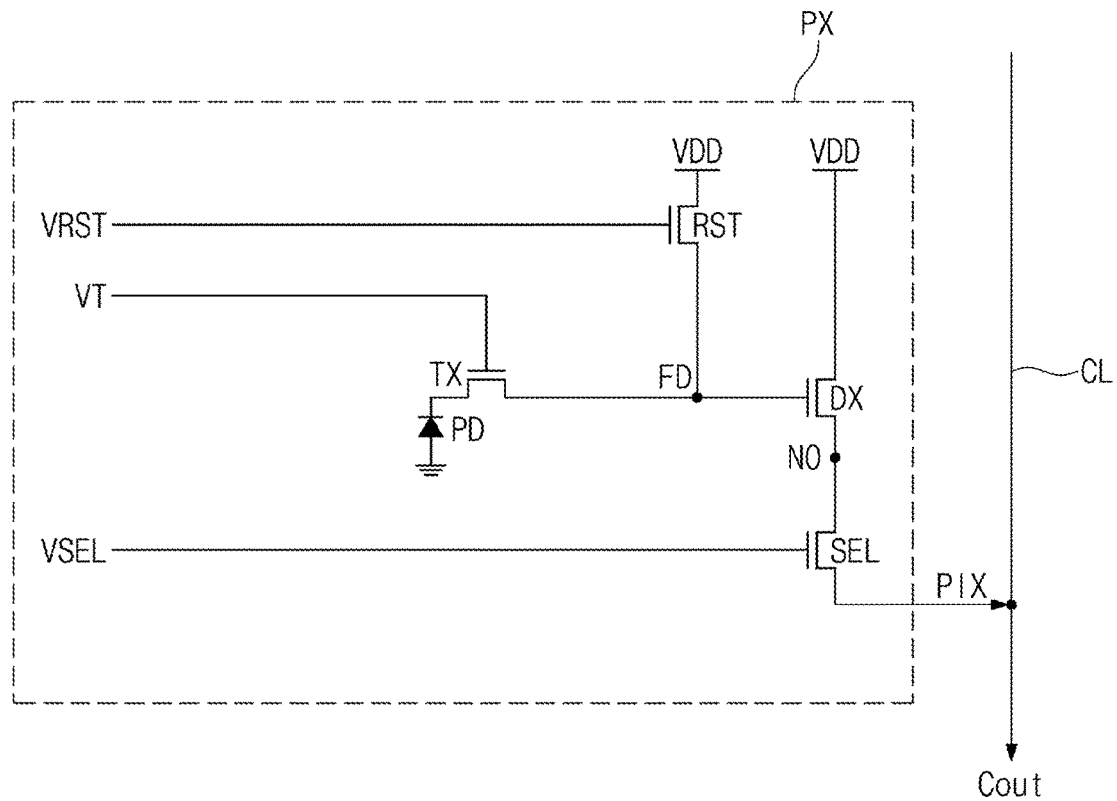
FIG. 3 is a circuit diagram illustrating an example of one of pixels of FIG. 2.

FIG. 3 is a circuit diagram illustrating an example of one of pixels of FIG. 2. For example, the pixel PX may include a photoelectric conversion element PD, a transfer transistor TX, a reset transistor RST, a drive transistor DX, and a select transistor SEL.

FIG. 3 shows an example structure 101 in which the pixel PX includes one photoelectric conversion element PD and one transfer transistor TX, but the present disclosure is not limited thereto. For example, the pixels PX included in the pixel array 110 may be implemented with various different structures.

The photoelectric conversion element PD may be configured to integrate charges in response to a light signal received from the outside. The transfer transistor TX may be connected between the photoelectric conversion elements PD and a floating diffusion node FD. The transfer transistor TX may operate in response to a transfer signal VT from the row driver 120. For example, the transfer transistor TX may be turned on in response to the transfer signal VT of the logic high level. While the transfer transistor TX is turned on in response to the transfer signal VT of the logic high level, the charges may be transferred from the photoelectric conversion elements PD to the floating diffusion node FD. As such, the voltage of the floating diffusion node FD may decrease.

The reset transistor RST may be connected between a power supply voltage VDD and the floating diffusion node FD. The reset transistor RST may operate in response to the reset signal VRST from the row driver 120. For example, the reset transistor RST may be turned on in response to the reset signal VRST of the logic high level. While the reset transistor RST is turned on in response to the reset signal VRST of the logic high level, the floating diffusion node FD may be reset. The voltage of the floating diffusion node FD which has been reset may be determined based on the power supply voltage VDD.

The drive transistor DX may be connected between the power supply voltage VDD and a 0-th node NO. The drive transistor DX may operate in response to the voltage of the floating diffusion node FD. For example, the gate terminal of the drive transistor DX may be connected to the floating diffusion node FD. In this case, the drive transistor DX may be configured to transfer the pixel signal PIX corresponding to the variation in the voltage of the floating diffusion node FD to the select transistor SEL through the 0-th node NO. That is, the drive transistor DX may operate as a source follower whose input terminal is connected to the floating diffusion node FD.

The above operation in which the pixel PX transfers, as the pixel signal PIX, the voltage corresponding to the amount of charges transferred to the floating diffusion node FD to the column lines CL through the drive transistor DX and the select transistor SEL is referred to as a "readout operation". Also, the process of turning on and turning off the transfer transistor TX such that the photoelectric conversion elements PD of the pixel PX integrates charges in response to a light incident from the outside referred to as a "shutter operation". Also, an operation of charging the floating diffusion node FD through the reset transistor RST referred to as a "reset operation".

For example, the voltage of the pixel signal PIX that the pixel PX outputs when the select transistor SEL is turned on after the reset operation is performed may be referred to as a "reset voltage". Also, the voltage of the pixel signal PIX that the pixel PX outputs when the select transistor SEL is turned on after the shutter operation is performed may be referred to as a "data voltage".

Meanwhile, the select transistor SEL may be turned off while the reset transistor RST is turned on to perform the reset operation. Also, the select transistor SEL may be turned off while the transfer transistor TX is turned on to perform the shutter operation. When the select transistor SEL is turned off, the column line CL may be at a floating state. In this case, when the select transistor SEL is again turned on, the column line CL may have an arbitrary voltage.

As described with reference to FIG. 2, the analog-to-digital converter 140 may generate the digital signal based on the difference between the reset sampling voltage and the data sampling voltage. The image sensor device 100 may operate normally under the condition that the reset sampling voltage is identical to the reset voltage and the data sampling voltage is identical to the data voltage.

That is, the analog-to-digital converter 140 may generate the digital signal for an image based on how much the voltage of the column line CL decreases compared to the reset voltage. For example, to obtain the reset sampling voltage being identical to the reset voltage, when a given time passes after the select transistor SEL is turned on, the analog-to-digital converter 140 should sample the voltage of the column line CL. The given time may mean a time taken to set the arbitrary voltage of the column line CL to the reset voltage. The time taken to set the arbitrary voltage of the column line CL to the reset voltage may be referred to as a "settling time".

Although not illustrated in FIG. 3, a column line connected to any other pixel may be at a floating state as the select transistor SEL is turned off and thus may have an arbitrary voltage. Accordingly, when the select transistors SEL of the pixel array 110 are turned off, the column lines (e.g., the column lines CL1 and CL2 of FIG. 2) may have different arbitrary voltages.

Accordingly, when the select transistors SEL are again turned on, the column lines may have different settling times. For this reason, the accuracy of correlated double sampling (CDS) for each column line may decrease, and a dynamic range of an image sensor may also decrease.

Figure 4:
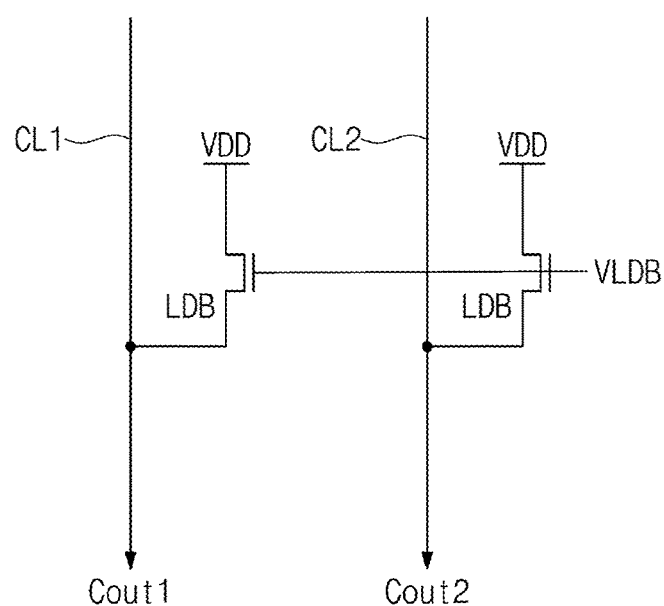
FIG. 4 is a circuit diagram illustrating an example of a line disconnection circuit.

FIG. 4 is a circuit diagram illustrating an example of a line disconnection circuit. As described with reference to FIG. 3, when select transistors are turned off, the column lines CL1 and CL2 may be floated. Afterwards, when the select transistors are again turned on, the column lines CL1 and CL2 may have different voltages. In this case, the performance of the image sensor device 100 may be reduced. In an embodiment, to prevent the above issue, the image sensor device 100 may include a line disconnection circuit 170. FIG. 4 will be described with reference to FIGS. 1 to 3.

The line disconnection circuit 170 may include a plurality of line disconnection transistors LDB. The plurality of line disconnection transistors LDB may be connected to the power supply voltage VDD and the corresponding column lines CL1 and CL2. For brevity of drawing and for convenience of description, an example in which the line disconnection circuit 170 includes two line disconnection transistors LDB is illustrated in FIG. 4, but the present disclosure is not limited thereto.

The line disconnection transistors LDB may operate in response to a line disconnection control signal VLDB from the timing controller 160. For example, the line disconnection transistors LDB may be turned on in response to the line disconnection control signal VLDB of the logic high level. The line disconnection transistors LDB may be turned on when the corresponding pixels PX11 to PX22 do not output the pixel signals PIX1 and PIX2. Accordingly, during a time period where the corresponding pixels PX11 to PX22 do not output the pixel signals PIX1 and PIX2 (i.e., during a time period where the select transistors SEL are in a turn-off state), the line disconnection circuit 170 may adjust voltages of the column lines CL1 and CL2.

In detail, the line disconnection transistors LDB may be turned on when the select transistors SEL of the pixels PX connected to the column lines CL1 and CL2 are turned off. In this case, even though the select transistors SEL are turned off, the column lines CL1 and CL2 may not be floated. While the select transistors SEL are turned off, the line disconnection transistors LDB may adjust voltages of the column lines CL1 and CL2. The voltages of the column lines CL1 and CL2 may be adjusted based on the power supply voltage VDD.

Accordingly, when the select transistors SEL of the pixel array 110 are turned off, the column lines CL1 and CL2 may not have different arbitrary voltages.

Figure 5:
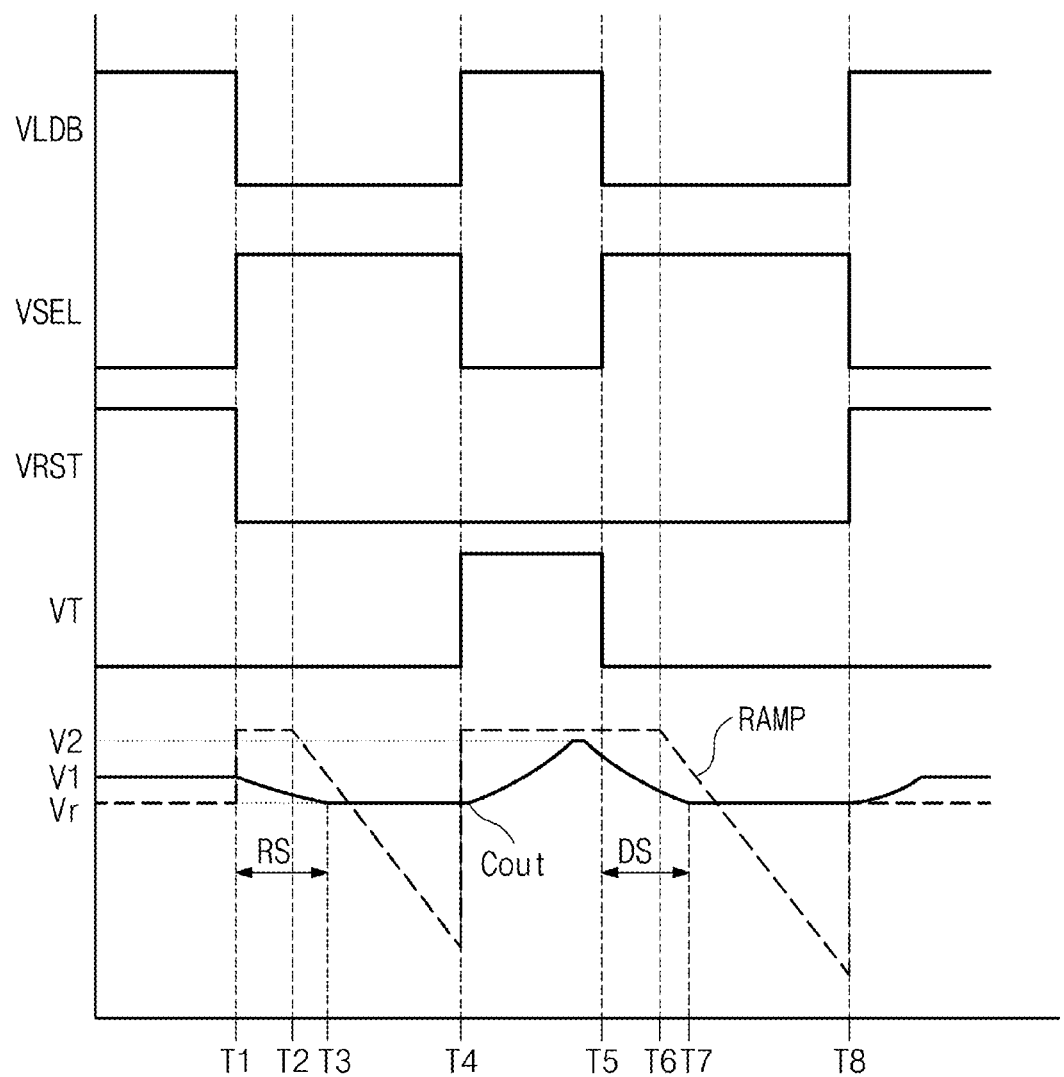
FIG. 5 is a timing diagram illustrating how a column line voltage is controlled by a line disconnection circuit.

FIG. 5 is an example timing diagram 171 illustrating how a column line voltage is controlled by a line disconnection circuit 170. The timing diagram illustrated in FIG. 5 is a timing diagram corresponding to a dark state (i.e., a state where the pixel PX does not receive a light). However, the present disclosure is not limited thereto. For example, the level of the column output signal Cout may be variously changed depending on the amount of light that the pixel PX receives. The description will be given with reference to FIG. 5 under the condition that the image sensor device 100 includes the line disconnection circuit 170 of FIG. 4.

Referring to FIGS. 3 to 5, before the first point in time T1, the reset signal VRST may be at the logic high level, and the selection signal VSEL and the transfer signal VT may be at the logic low level. In this case, the reset transistor RST of the pixel PX may be turned on, and the select transistor SEL may be turned off. That is, the pixel PX may perform the reset operation. The voltage of the reset floating diffusion node FD may be determined based on the power supply voltage VDD.

Also, the line disconnection control signal VLDB may be at the logic high level. The line disconnection transistor LDB may be turned on in response to the line disconnection control signal VLDB of the logic high level. Accordingly, even though the select transistor SEL is turned off, the column line CL may not be floated.

The voltage of the column output signal Cout may be adjusted by the line disconnection transistor LDB. Before the first point in time T1, the voltage of the column output signal Cout may be a first voltage V1.

During the time period from T1 to T4, to perform the readout operation, the selection signal VSEL may be maintained at the logic high level, and the reset signal VRST may be maintained at the logic low level. According to the above bias condition, the reset transistor RST may be turned off, and the select transistor SEL of the pixel PX may be turned on; in this case, the pixel PX may output the pixel signal PIX to the column line CL. In this case, the voltage of the pixel signal PIX may be a reset voltage Vr. The reset voltage Vr may be determined based on the voltage of the floating diffusion node FD which has been reset of the pixel PX. Also, an offset may be applied to a ramp signal VRAMP at the first point in time T1, and the ramp signal VRAMP may decrease from the second point in time T2.

In an embodiment, the pixel array 110 and the line disconnection circuit 170 may be included in different chips. Accordingly, the process of manufacturing the pixel array 110 may be different from the process of manufacturing the line disconnection circuit 170. This may mean that the voltage level of the first voltage V1 is different from the voltage level of the reset voltage Vr. For example, the voltage level of the first voltage V1 may be higher than the voltage level of the reset voltage Vr.

Also, during the time period from T1 to T4, the line disconnection control signal VLDB may be maintained at the logic low level. As the line disconnection transistor LDB is turned off in response to the line disconnection control signal VLDB of the logic low level, at the third point in time T3, the column output signal Cout may have the reset voltage Vr based on the voltage of the pixel signal PIX.

For example, a time that is taken for the voltage of the column output signal Cout to reach the reset voltage Vr after the select transistor SEL is turned on to perform the readout operation may be referred to as a "reset settling time RS".

The reset sampling operation may be performed in the time period from T2 to T4. In detail, the ramp signal RAMP and the column output signal Cout may be compared in the time period from T2 to T4. The voltage of the column output signal Cout may be the reset voltage Vr. The voltage of the column output signal Cout may be identical to the voltage of the ramp signal RAMP between the third point in time T3 and the fourth point in time T4. For example, a voltage of the column output signal Cout, which is identical to the voltage of the ramp signal RAMP, may be referred to as a "reset sampling voltage". In FIG. 5, the reset sampling voltage may be the reset voltage Vr.

Afterwards, during the time period from T4 to T5, the selection signal VSEL may be at the logic low level, and the transfer signal VT may be at the logic high level. The select transistor SEL may be turned off in response to the selection signal VSEL of the logic low level, and the transfer transistor TX may be turned on in response to the transfer signal VT of the logic high level. In the dark state, charges may not be generated by the photoelectric conversion elements PD. As such, the voltage of the floating diffusion node FD may be maintained in the reset state. Meanwhile, at the fourth point in time T4, the offset may be again applied to the ramp signal RAMP.

Also, the line disconnection control signal VLDB may be at the logic high level. The line disconnection transistor LDB may be turned on in response to the line disconnection control signal VLDB of the logic high level. In this case, the voltage of the column output signal Cout may reach a second voltage V2 during the time period from T4 to T5.

Afterwards, during the time period from T5 to T8, to perform the readout operation, the selection signal VSEL may be maintained at the logic high level, and the transfer signal VT may be maintained at the logic low level. The transfer transistor TX may be turned off in response to the transfer signal VT of the logic low level. The voltage of the ramp signal RAMP may decrease from the sixth point in time T6.

The select transistor SEL may be turned on in response to the selection signal VSEL of the logic high level. In this case, the pixel PX may output the pixel signal PIX having the data voltage to the column line CL. As described above, because FIG. 5 shows the operation in the dark state, the data voltage may be identical to the reset voltage Vr.

Also, during the time period from T5 to T8, the line disconnection control signal VLDB may be maintained at the logic low level. As the line disconnection transistor LDB is turned off in response to the line disconnection control signal VLDB of the logic low level, at the seventh point in time T7, the column output signal Cout may have the reset voltage Vr based on the voltage of the pixel signal PIX.

For example, a time that is taken for the voltage of the column output signal Cout to reach the reset voltage Vr after the select transistor SEL is turned on to perform the data sampling operation may be referred to as a "data settling time DS".

The data sampling operation may be performed in the time period from T7 to T8. In detail, the ramp signal RAMP and the column output signal Cout may be compared in the time period from T7 to T8. The voltage of the column output signal Cout may be identical to the voltage of the ramp signal RAMP between the seventh point in time T7 and the eighth point in time T8. For example, a voltage of the column output signal Cout, which is identical to the voltage of the ramp signal RAMP, may be referred to as a "data sampling voltage". In FIG. 5, the data sampling voltage may be the reset voltage Vr.

In the case of FIG. 5, because the voltage of the ramp signal RAMP coincides with the voltage of the column output signal Cout after the reset settling time RS and the data settling time DS pass, a difference between the reset sampling voltage and the data sampling voltage may be "0".

However, for the high-speed operation of the image sensor device 100, the voltage of the ramp signal RAMP may start to decrease at points in time that are advanced with respect to the points in time (e.g., T2 and T6) illustrated in FIG. 5. In this case, before the settling time RS/DS passes, the voltage of the ramp signal RAMP may coincide with the voltage of the column output signal Cout. This may mean that a difference between the reset sampling voltage and the data sampling voltage is not "0" even in the dark state. Accordingly, the image sensor device 100 may fail to recognize an image properly.

In other words, for the image sensor device 100 to perform the high-speed operation, there may be a need to decrease the reset settling time RS and the data settling time DS. As described above, the settling time RS/DS may be caused due to a difference between the reset voltage Vr and the voltage (e.g., V1 and V2) of the column output signal Cout adjusted by the line disconnection transistor LDB. As described above, the voltage difference may be caused due to the process difference of the pixel array 110 and the line disconnection circuit 170 that are included in different chips.

Also, referring to FIGS. 2 and 4, the line disconnection transistor LDB may perform the operation of adjusting the voltage of the column line CL with respect to all the rows of the pixel array 110. The distance between the pixel PX and the line disconnection transistor LDB may differ for each row of the pixel array 110. This may mean that when the line disconnection circuit 170 operates, an IR drop and an RC delay due to a line resistance and a line capacitance of the column line CL differ for each row. In other words, it may be difficult for the line disconnection transistor LDB to accurately adjust the voltage level of the column line CL. Also, a time necessary for the line disconnection transistor LDB to adjust the voltage level of the column line CL may be excessively long.

The image sensor device 100 according to an embodiment of the present disclosure may not include the line disconnection circuit 170. The image sensor device 100 may adjust voltages of column lines connected to pixels of a row, which are generating the pixel signals, (i.e., pixels, which perform the read operation) based on an operation of a pixel that is located at an adjacent row and does not generate a pixel signal (e.g., based on an operation of a pixel that previously performs the readout operation).

The above operation of the pixel array 110 may be performed under control of the row driver 120 (refer to FIG. 1) and the timing controller 160 (refer to FIG. 1). Below, the operation in which the voltage of the column line is controlled by the pixel array 110 of the present disclosure is referred to as an "in-pixel LDB (IPL) operation". According to the IPL operation, it may be possible to prevent column lines from being floated by using only transistors included in the pixel array 110. That is, it may be possible to prevent column lines from being floated by using only transistors implemented by the same manufacturing process.

In other words, the IPL operation may be performed by transistors that are manufactured by the same process as the pixel PX. This may mean that the voltage of the column line CL is substantially identical to a reset voltage (e.g., Vr of FIG. 5) while the select transistor SEL is turned on. Accordingly, the reset settling time RS and the data settling time DS may be decreased through the IPL operation.

In addition, with regard to all the pixels, the pixel array 110 may adjust voltage levels of column lines based on operations of other pixels located at a row spaced from a pixel targeted for the readout operation as much as a given distance, and thus, the pixel location may not affect the function of adjusting voltage levels of column lines.

According to an embodiment of the present disclosure, the image sensor device 100 with improved performance may be provided. The IPL operation will be described in detail with reference to FIGS. 6 to 8.

Figure 6:
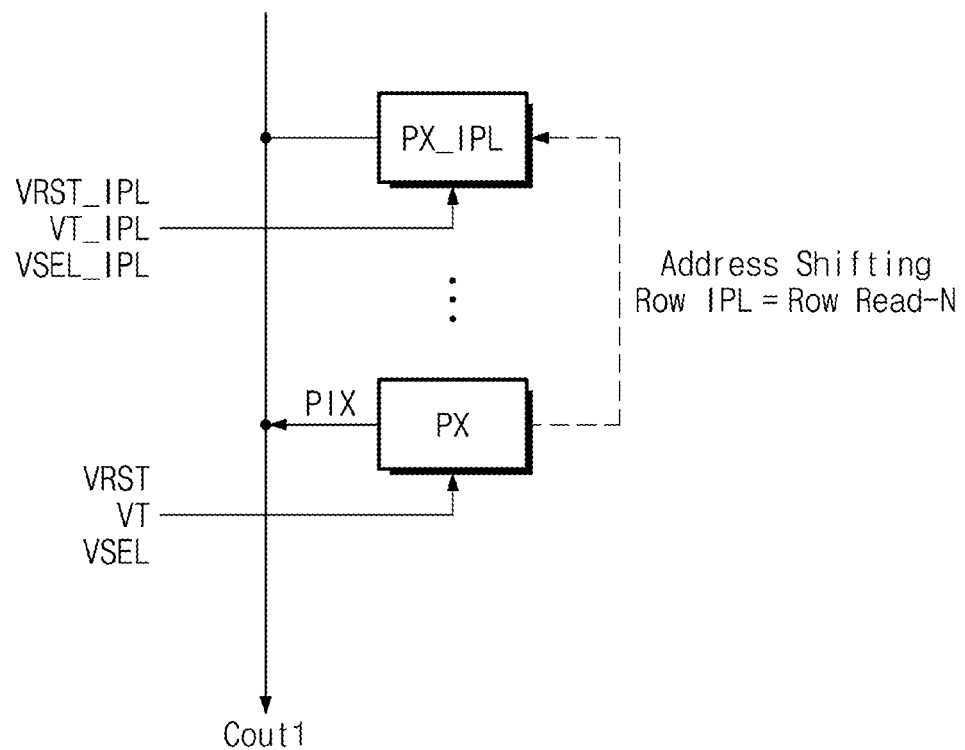
FIG. 6 illustrates an example in which a voltage of a column line is controlled by a pixel array.

FIG. 6 illustrates an example circuit 172 in which a voltage of a column line is controlled by a pixel array. Referring to FIG. 6, the pixel array 110 may include a plurality of pixels PX and PX_IPL. Each of the plurality of pixels PX and PX_IPL may be connected to the column line CL.

In an embodiment, each of the plurality of pixels PX and PX_IPL may have the same structure as the pixel PX described with reference Each FIG. 3. However, the present disclosure is not limited thereto. For example, the pixels PX and PX_IPL may be implemented to have any other structures. Also, it is assumed that the image sensor device 100 does not include the line disconnection circuit 170 (refer to FIG. 4).

Also, for brevity of drawing and for clearness of description, it is assumed that the readout operation is performed in the pixel PX and the IPL operation is performed in the IPL pixel PX_IPL. Below, the description will be given with reference to FIGS. 1 to 3.

The pixel PX may receive the reset signal VRST, the transfer signal VT, and the selection signal VSEL from the row driver 120. The IPL pixel PX_IPL may receive an IPL reset signal VRST_IPL, an IPL transfer signal VT_IPL, and an IPL selection signal VSEL_IPL from the row driver 120.

For example, the pixel PX may output the pixel signal PIX to the column line CL in response to the selection signal VSEL of the logic high level. The voltage of the pixel signal PIX may be a reset voltage or a data voltage.

For example, before the selection signal VSEL transitions to the logic high level, the voltage of the column line CL connected to the pixel PX may be adjusted based on the IPL operation of the IPL pixel PX_IPL that is located at a row adjacent to a pixel, does not generate the pixel signal PIX (i.e., already completes the readout operation), is connected to the same column line CL. In other words, before the select transistor SEL of the pixel PX is turned on, the voltage level of the column line CL may be adjusted by the IPL pixel PX_IPL.

For example, while the select transistor SEL of the pixel PX targeted for the readout operation is turned off in response to the select transistor SEL of the logic low level, the select transistor SEL of the IPL pixel PX_IPL targeted for the IPL operation may be turned on in response to the IPL selection signal VSEL_IPL of the logic high level. The turned-on select transistor SEL may adjust the voltage level of the column line CL based on the voltage level of the floating diffusion node FD which has been reset of the IPL pixel PX_IPL. As in the readout operation, the floating diffusion node FD of the IPL pixel PX_IPL may be reset as the reset transistor RST is turned on in response to the IPL reset signal VRST_IPL.

Afterwards, while the select transistor SEL of the pixel PX is turned on in response to the selection signal VSEL of the logic high level, the select transistor SEL of the IPL pixel PX_IPL may be turned off in response of the IPL selection signal VSEL_IPL of the logic low level. When the select transistor SEL of the pixel PX is again turned off in response to the selection signal VSEL of the logic low level, the select transistor SEL of the IPL pixel PX_IPL may be again turned on in response to the IPL selection signal VSEL_IPL of the logic high level, and thus, the voltage level of the column line CL may be adjusted based on the voltage level of the floating diffusion node FD which has been reset of the IPL pixel PX_IPL.

In other words, according to an embodiment of the present disclosure, while the select transistor SEL of the pixel PX under the readout operation is turned off, the select transistor SEL of the IPL pixel PX_IPL may be turned on, and thus, the voltage of the column line CL may be adjusted based on the voltage level of the reset floating diffusion node FD of the IPL pixel PX_IPL. The above method may replace the method in which the voltage of the column line CL is controlled by the line disconnection circuit 170, which is described with reference to FIGS. 4 and 5.

The voltage of the column line CL may be adjusted by the IPL pixel PX_IPL having the same structure as the pixel PX in which the readout operation is performed. The pixel PX and the IPL pixel PX_IPL may be manufactured by using the same process. Also, while the select transistor SEL of the pixel PX is turned off, the voltage of the column line CL may be adjusted based on the voltage of the reset floating diffusion node FD of the IPL pixel PX_IPL. In other words, according to the IPL operation, the voltage of the column line CL may be substantially identical to the reset voltage Vr while the select transistor SEL of the pixel PX is turned off. This may mean that the reset settling time (e.g., RS of FIG. 5) and the data settling time (e.g., DS of FIG. 5) decrease. That is, when the voltage of the column line CL is adjusted through the IPL operation, the settling time may be decreased compared to the case of using the line disconnection circuit 170 (refer to FIG. 4).

In an embodiment, the IPL pixel PX_IPL may be a pixel group where the readout operation is already completed. For example, the IPL pixel PX_IPL may be a pixel located at a row Row_IPL spaced from a row Row_Read, at which there is a pixel where the readout operation is to be performed, as much as a given value "N" (N being 8, 16, 32, etc.) (Row_IPL=Row_Read−N).

That is, with regard to all the pixels, the pixel array 110 may adjust voltage levels of column lines based on the operations of the IPL pixels PX_IPL located at a row spaced from a pixel targeted for the readout operation as much as a given distance, and thus, the pixel location may not affect the function of adjusting the voltage levels of the column lines. According to an embodiment of the present disclosure, the image sensor device 100 with improved performance may be provided.

Figure 7:
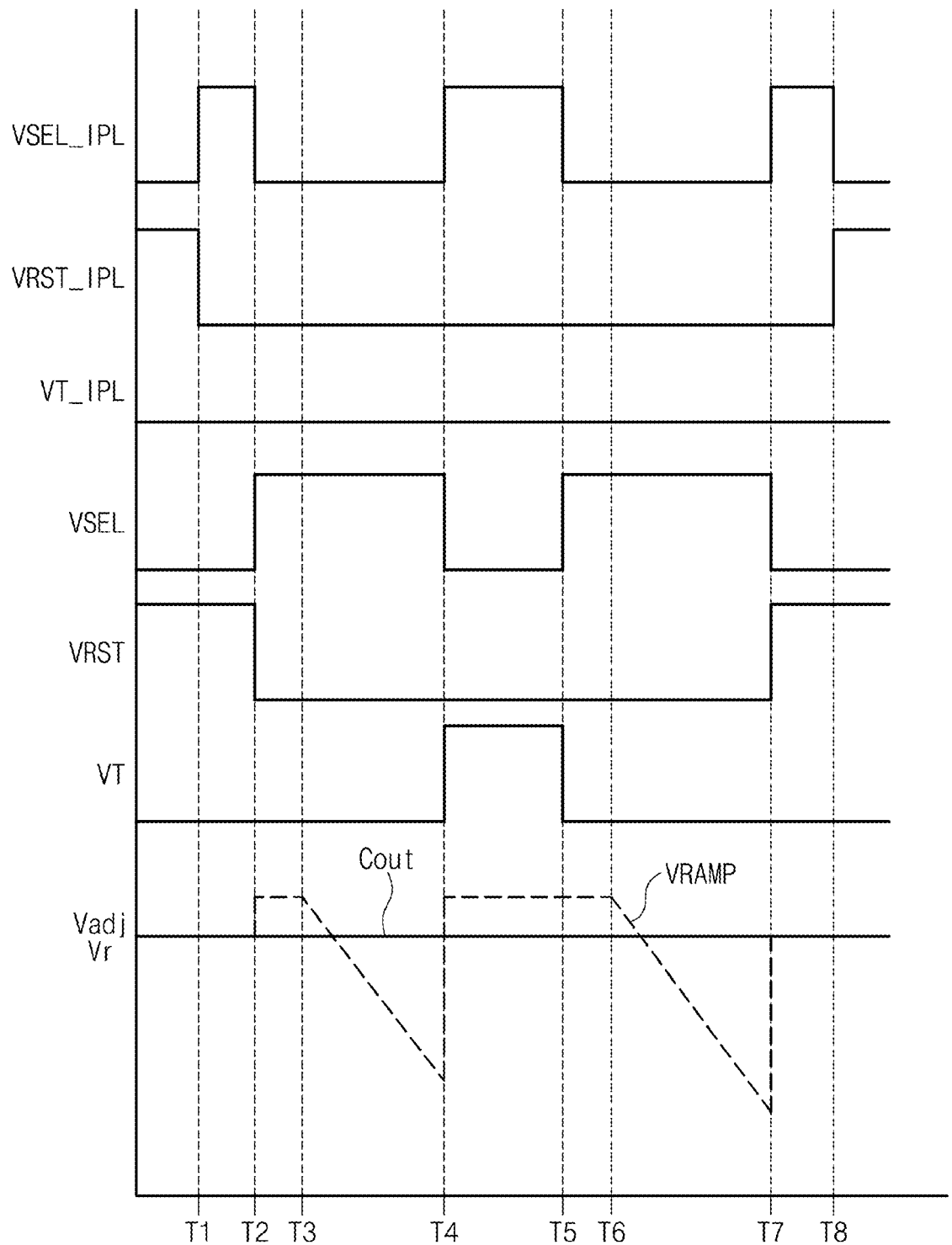
FIG. 7 is a timing diagram illustrating a pixel output level control operation according to the present disclosure.

FIG. 7 is an example timing diagram 173 illustrating a pixel output level control operation according to the present disclosure. The timing diagram 173 illustrated in FIG. 7 is a timing diagram corresponding to a dark state (i.e., a state where the pixel PX does not receive a light). However, the present disclosure is not limited thereto. For example, the level of the column output signal Cout may be variously changed depending on the amount of light that the pixel PX receives. FIG. 7 will be described with reference to FIGS. 1, 3 and 6.

In the time period illustrated in FIG. 7, the IPL transfer signal VT_IPL may be at the logic low level. In this case, the transfer transistor TX of the IPL pixel PX_IPL may be turned off in response to the IPL transfer signal VT_IPL of the logic low level.

Before the first point in time T1, the reset signal VRST and the IPL reset signal VRST_IPL may be at the logic high level, and the selection signal VSEL, the IPL selection signal VSEL_IPL, and the transfer signal VT may be at the logic low level. In this case, the reset transistors RST of the pixel PX and the IPL pixel PX_IPL may be turned on, and the select transistors SEL thereof may be turned off. That is, the pixel PX and the IPL pixel PX_IPL may perform the reset operation. Through the reset operation, the floating diffusion nodes FD of the pixel PX and the IPL pixel PX_IPL may be charged based on the power supply voltage VDD.

During the time period from T1 to T2, the IPL reset signal VRST_IPL may be at the logic low level, and the IPL selection signal VSEL_IPL may be at the logic high level. The reset transistor RST of the IPL pixel PX_IPL may be turned off in response to the IPL reset signal VRST_IPL of the logic low level. The select transistor SEL of the IPL pixel PX_IPL may be turned on in response to the IPL selection signal VSEL_IPL of the logic high level. According to the above description, the voltage of the column output signal Cout may be set to an adjustment voltage Vadj based on the voltage of the reset floating diffusion node FD. That is, during the time period from T1 to T2, the IPL pixel PX_IPL may perform the IPL operation.

As described above, the IPL operation may be performed by the IPL pixel PX_IPL located at a row adjacent to a row including the pixel PX generating the pixel signal PIX. In an embodiment, the pixel PX and the IPL pixel PX_IPL may be manufactured by using the same process. Also, the adjustment voltage Vadj that is formed through the IPL operation may be determined based on the voltage of the reset floating diffusion node FD of the IPL pixel PX_IPL. Accordingly, the adjustment voltage Vadj may be substantially identical to the reset voltage Vr.

At the second point in time T2, the reset signal VRST may transition to the logic low level, and thus, the reset transistor RST may be turned off.

During the time period from T2 to T4, to perform the readout operation, the selection signal VSEL may be maintained at the logic high level, and thus, the select transistor SEL of the pixel PX may be turned on; in this case, the pixel PX may output the pixel signal PIX having the reset voltage Vr to the column line CL. Also, an offset may be applied to the ramp signal VRAMP at the second point in time T2, and the ramp signal VRAMP may decrease from the third point in time T3.

During the time period from T2 to T4, the IPL selection signal VSEL_IPL may be maintained at the logic low level, and thus, the select transistor SEL of the IPL pixel PX_IPL may be turned off. That is, the IPL pixel PX_IPL may not perform the IPL operation.

As described above, through the IPL operation, the voltage of the column output signal Cout at the second point in time T2 may be the adjustment voltage Vadj. The adjustment voltage Vadj may be substantially identical to the reset voltage Vr. Accordingly, the reset settling time RS described with reference to FIG. 5, that is, the time necessary for the voltage of the column output signal Cout to reach the reset voltage Vr after the second point in time T2 may not be required.

In an embodiment, there may be a difference between the adjustment voltage Vadj and the reset voltage Vr. The voltage difference may be caused by a physical characteristic (e.g., a threshold voltage change) of transistors of the IPL pixel PX_IPL. However, because the IPL pixel PX_IPL and the pixel PX are manufactured by the same process, the voltage difference may be small compared to the case of FIG. 5 (e.g., a difference between the first voltage V1 and the reset voltage Vr). According, the reset settling time may decrease through the IPL operation according to an embodiment of the present disclosure.

The reset sampling operation may be performed in the time period from T3 to T4. In detail, the ramp signal RAMP and the column output signal Cout may be compared in the time period from T3 to T4. The voltage of the column output signal Cout may be the reset voltage Vr. The voltage of the column output signal Cout may be identical to the voltage of the ramp signal RAMP between the third point in time T3 and the fourth point in time T4. Accordingly, in FIG. 7, the reset sampling voltage may be the reset voltage Vr.

Afterwards, during the time period from T4 to T5, the selection signal VSEL may be at the logic low level, and the transfer signal VT may be at the logic high level. The select transistor SEL of the pixel PX may be turned off in response to the selection signal VSEL of the logic low level, and the transfer transistor TX of the pixel PX may be turned on in response to the transfer signal VT of the logic high level. That is, the pixel PX may perform the shutter operation. In the dark state, charges may not be generated by the photoelectric conversion elements PD. In this case, the voltage of the floating diffusion node FD of the pixel PX may be maintained. That is, the voltage of the floating diffusion node FD of the pixel PX may be the voltage of the reset floating diffusion node FD. Meanwhile, at the fourth point in time T4, the offset may be again applied to the ramp signal RAMP.

Also, the IPL selection signal VSEL_IPL may transition to the logic high level. The select transistor SEL of the IPL pixel PX_IPL may be turned on in response to the IPL selection signal VSEL_IPL of the logic high level. Accordingly, the voltage of the column output signal Cout may be adjusted by the IPL pixel PX_IPL. As described above, the voltage of the column output signal Cout may be set to the adjustment voltage Vadj based on the voltage of the reset floating diffusion node FD.

Afterwards, during the time period from T5 to T8, to perform the readout operation, the selection signal VSEL may be maintained at the logic high level, and the transfer signal VT may be maintained at the logic low level. The transfer transistor TX of the pixel PX may be turned off in response to the transfer signal VT of the logic low level, and the ramp signal RAMP may decrease from the sixth point in time T6.

The select transistor SEL of the pixel PX may be turned on in response to the selection signal VSEL of the logic high level. In this case, the pixel PX may output the pixel signal PIX having the data voltage to the column line CL. As described above, because FIG. 5 shows the operation in the dark state, the data voltage may be identical to the reset voltage Vr.

Also, during the time period from T5 to T8, the IPL selection signal VSEL_IPL may be maintained at the logic low level, and thus, the select transistor SEL of the IPL pixel PX_IPL may be turned off. That is, the IPL pixel PX_IPL may not perform the IPL operation.

As described above, through the IPL operation, the voltage of the column output signal Cout at the fifth point in time T5 may be the adjustment voltage Vadj. The adjustment voltage Vadj may be substantially identical to the reset voltage Vr. Accordingly, the data settling time DS described with reference to FIG. 5, that is, the time necessary for the voltage of the column output signal Cout to reach the reset voltage Vr after the select transistor SEL of the pixel PX is turned on may not be required.

The data sampling operation may be performed in the time period from T6 to T7. In detail, the ramp signal RAMP and the column output signal Cout may be compared in the time period from T6 to T7. The voltage of the column output signal Cout may be identical to the voltage of the ramp signal RAMP between the sixth point in time T6 and the seventh point in time T7. For example, a voltage of the column output signal Cout, which is identical to the voltage of the ramp signal RAMP, may be referred to as a "data sampling voltage". In FIG. 7, the data sampling voltage may be the reset voltage Vr.

At the seventh point in time T7, as the selection signal VSEL transitions to the logic low level and the reset signal VRST transitions to the logic high level, the select transistor SEL of the pixel PX may be turned off, and the reset transistor RST of the pixel PX may be turned on. That is, the pixel PX may perform the reset operation.

Meanwhile, during the time period from T7 to T8, the IPL selection signal VSEL_IPL may be maintained at the logic high level, and thus, the IPL pixel PX_IPL may perform the IPL operation.

At the eighth point in time T8, as the IPL reset signal VRST_IPL transitions to the logic high level and the IPL selection signal VSEL_IPL transitions to the logic low level, the reset transistor RST of the IPL pixel PX_IPL may be turned on, and the select transistor SEL of the IPL pixel PX_IPL may be turned off. That is, the IPL pixel PX_IPL may perform the reset operation.

As described above, the voltage of the column output signal Cout, which is adjusted by the IPL operation, may be substantially identical to the reset voltage Vr formed by the reset operation of the pixel PX. Accordingly, the reset settling time RS and the data settling time DS may be decreased by the IPL operation. This may mean that the performance of the image sensor device 100 is improved.

The timing of the readout operation and the IPL operation of the pixel array 110 according to an embodiment of the present disclosure is described with reference to FIG. 7, but the present disclosure is not limited thereto. For example, the timing of signals may be modified depending on the way to implement.

In an embodiment, while the pixel PX targeted for the readout operation performs the reset operation, the IPL reset signal VRST_IPL may transition to the logic low level at a point in time (e.g., T1) that is advanced with respect to the point in time T2 when the reset signal VRST transitions to the logic low level. The IPL selection signal VSEL_IPL may transition to the logic high level at the point in time (e.g., T1) when the IPL reset signal VRST_IPL transitions to the logic low level. Afterwards, the IPL selection signal VSEL_IPL may transition to the logic low level at the point in time (e.g., T2) when the selection signal VSEL transitions to the logic high level or when a given time passes from the point in time (e.g., T2) when the selection signal VSEL transitions to the logic high level. In this case, the point in time when the IPL selection signal VSEL_IPL transitions to the logic low level may be advanced with respect to the point in time (e.g., T4) when the selection signal VSEL again transitions to the logic low level.

In an embodiment, while the pixel PX targeted for the readout operation performs the reset operation, the IPL reset signal VRST_IPL may transition to the logic low level before the point in time (e.g., T2) when the reset signal VRST transitions to the logic low level. The IPL selection signal VSEL_IPL may transition to the logic high level at a point in time when a given time passes from the point in time (e.g., T1) when the IPL reset signal VRST_IPL transitions to the logic low level. The point in time when the IPL selection signal VSEL_IPL transitions to the logic high level may be advanced with respect to the point in time (e.g., T2) when the selection signal VSEL transitions to the logic high level. Afterwards, the IPL selection signal VSEL_IPL may transition to the logic low level at the point in time (e.g., T2) when the selection signal VSEL transitions to the logic high level or when a given time passes from the point in time (e.g., T2) when the selection signal VSEL transitions to the logic high level. In this case, the point in time when the IPL selection signal VSEL_IPL transitions to the logic low level may be advanced with respect to the point in time (e.g., T4) when the selection signal VSEL again transitions to the logic low level.

In an embodiment, unlike the example illustrated in FIG. 7, both the IPL selection signal VSEL_IPL and the IPL reset signal VRST_IPL may be at the logic high level before the second point in time T2 and may transition to the logic low level at the second point in time T2. Also, after the seventh point in time T7, both the IPL selection signal VSEL_IPL and the IPL reset signal VRST_IPL may be at the logic high level. In this case, when the IPL operation is performed to decrease the reset settling time (e.g., RS of FIG. 5), the reset transistor RST and the select transistor SEL of the IPL pixel PX_IPL may be turned on, and thus, the voltage of the column line CL may be adjusted.

Figure 8:
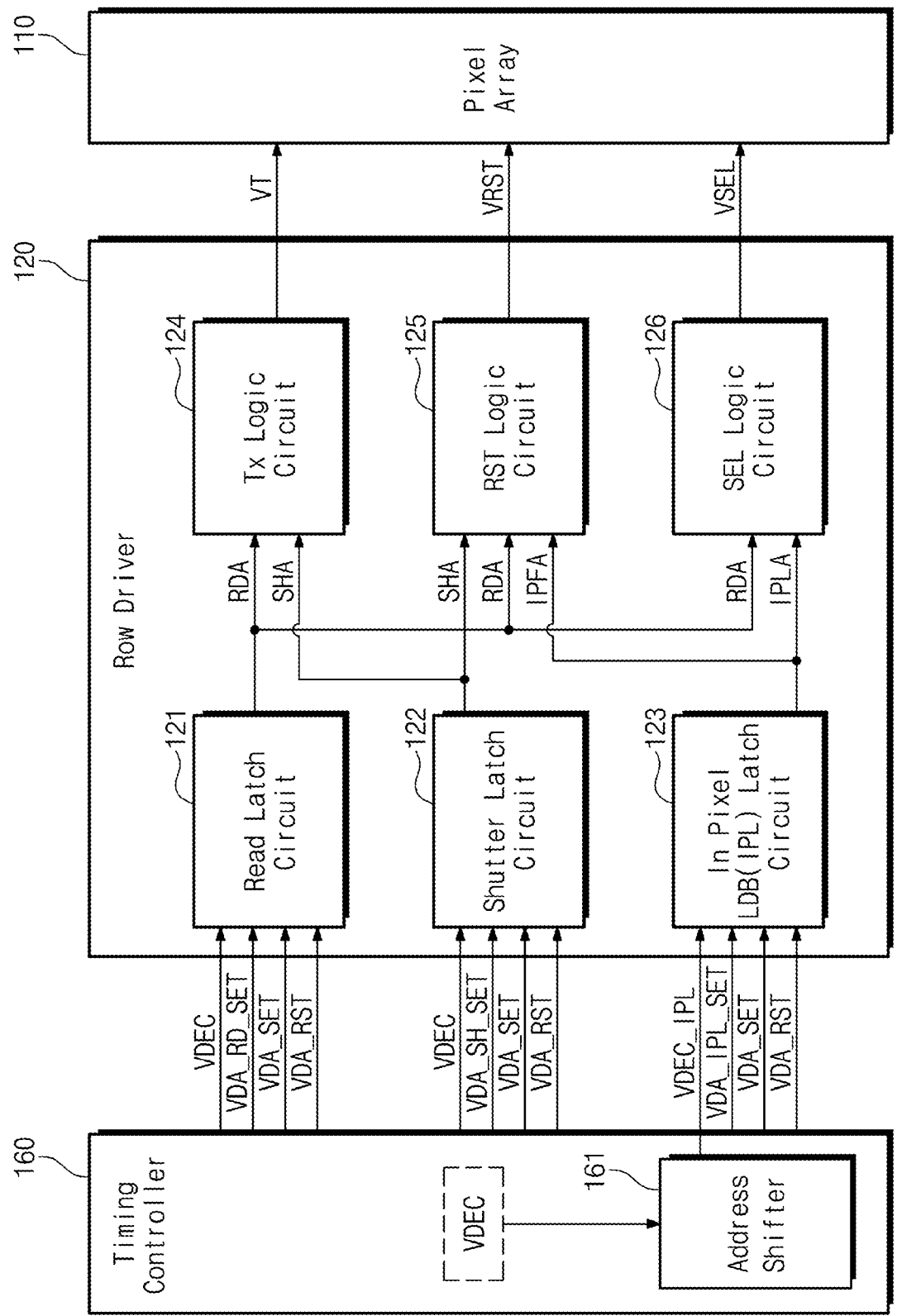
FIG. 8 illustrates an example of a configuration of a row driver of FIG. 1.

FIG. 8 illustrates an example of a configuration of the row driver 120 of FIG. 1. As described with reference to FIG. 1, under control of the timing controller 160, the row driver 120 may provide the pixel array 110 with the transfer signal VT, the reset signal VRST, and the selection signal VSEL for selecting and driving a row of the pixel array 110.

The row driver 120 may include a read latch circuit 121, a shutter latch circuit 122, an IPL latch circuit 123, a transfer logic circuit 124, a reset logic circuit 125, and a selection logic circuit 126.

The latch circuits 121, 122, and 123 may store addresses generated by the timing controller 160 based on control signals from the timing controller 160, so as to be provided to the logic circuits 124, 125, and 126. The logic circuits 124, 125, and 126 may control the pixel array 110 based on the addresses provided from the latch circuits 121, 122, and 123.

The timing controller 160 may generate a vertical decoding signal VDEC and may provide the vertical decoding signal VDEC to the read latch circuit 121 and the shutter latch circuit 122. For example, the vertical decoding signal VDEC may indicate a row address that the read latch circuit 121 and the shutter latch circuit 122 will store (i.e., an address of a row at which the readout operation and the shutter operation will be performed). As described above, the readout operation refers to an operation of reading out data from pixels, and the shutter operation refers to an operation of opening a shutter such that the pixels receive a light from the outside.

The timing controller 160 may include the address shifter 161 that generates an IPL vertical decoding signal VDEC_IPL based on the vertical decoding signal VDEC. In detail, the address shifter 161 may generate the IPL vertical decoding signal VDEC_IPL indicating a row address shifted from a row address corresponding to the vertical decoding signal VDEC as much as the given number of rows.

For example, the IPL vertical decoding signal VDEC_IPL may indicate a row address that the IPL latch circuit 123 will store (i.e., an address of a row at which the IPL operation is to be performed). In other words, the address of the row at which the IPL operation is to be performed may be an address shifted from the address of the row at which the readout operation is to be performed, as much as the given number of rows. For example, a row of the pixel array 110, at which the IPL operation is to be performed, may be one of the rows of the pixel array 110, at which the readout operation is already completed.

Also, the timing controller 160 may generate latch set signals VDA_RD_SET, VDA_SH_SET, and VDA_IPL_SET for activating an operation in which the latch circuits 121, 122, and 123 store and maintain addresses (in other words, an operation of determining whether to store and maintain the provided addresses). That is, when the latch circuits 121, 122, and 123 of the present disclosure are not provided with the activated latch set signals VDA_RD_SET, VDA_SH_SET, and VDA_IPL_SET, even though the vertical decoding signal VDEC or the IPL vertical decoding signal VDEC_IPL is provided thereto, the latch circuits 121, 122, and 123 may fail to store relevant row addresses.

In addition, the timing controller 160 may generate a latch control signal VDA_SET and a latch reset signal VDA_RST for controlling operations of the latch circuits 121, 122, and 123. The latch control signal VDA_SET may allow the latch circuits 121, 122, and 123 to store and maintain a signal (e.g., a row address that the vertical decoding signal VDEC or the IPL vertical decoding signal VDEC_IPL indicates), and the latch reset signal VDA_RST may allow the latch circuits 121, 122, and 123 to be reset.

As described above, for the latch circuits 121, 122, and 123 to store and maintain signals in response to the latch control signal VDA_SET, first, the latch circuits 121, 122, and 123 have to be provided with the activated latch set signals VDA_RD_SET, VDA_SH_SET, and VDA_IPL_SET.

The read latch circuit 121 may store and maintain an address (hereinafter referred to as a "readout address") of a row of the pixel array 110, at which the readout operation will be performed, during a given time, and the shutter latch circuit 122 may store and maintain an address (hereinafter referred to as a "shutter address") of a row of the pixel array 110, at which the shutter operation will be performed, during a given time. Both the read latch circuit 121 and the shutter latch circuit 122 may be provided with the vertical decoding signal VDEC.

In detail, the read latch circuit 121 may store and maintain a readout address RDA indicated by the vertical decoding signal VDEC in response to the activated read latch enable signal VDA_RD_SET and the activated latch control signal VDA_SET, and the shutter latch circuit 122 may store and maintain a shutter address SHA indicated by the vertical decoding signal VDEC in response to the activated shutter latch enable signal VDA_SH_SET and the activated latch control signal VDA_SET.

After a given time passes, the read latch circuit 121 and the shutter latch circuit 122 may be initialized in response to the latch reset signal VDA_RST. The read latch circuit 121 may provide the readout address RDA to the logic circuits 124, 125, and 126, and the shutter latch circuit 122 may provide the shutter address SHA to the transfer logic circuit 124 and the reset logic circuit 125.

The IPL latch circuit 123 may store and maintain an address (hereinafter referred to as an "IPL address") of a row of the pixel array 110, at which the IPL operation will be performed, during the given time. The IPL latch circuit 123 may be provided with the IPL vertical decoding signal VDEC_IPL. In detail, the IPL latch circuit 123 may store and maintain an IPL address IPLA indicated by the IPL vertical decoding signal VDEC_IPL in response to the activated IPL latch set signal VDA_IPL_SET and the activated latch control signal VDA_SET. After a given time passes, the IPL latch circuit 123 may be initialized in response to the latch reset signal VDA_RST. The IPL latch circuit 123 may provide the IPL address IPLA to the reset logic circuit 125 and the selection logic circuit 126.

The transfer logic circuit 124 may provide the transfer signal VT to a pixel located at a row of the pixel array 110, at which the readout address or the shutter operation will be performed, based on the readout address RDA or the shutter address SHA. The reset logic circuit 125 may provide the reset signal VRST to a pixel located at a row at which the readout operation, the shutter operation, or the IPL operation will be performed, based on the readout address RDA, the shutter address SHA, or the IPL address IPLA. The selection logic circuit 126 may provide the selection signal VSEL to a row located at a row at which the readout operation or the IPL operation will be performed, based on the readout address RDA or the IPL address IPLA.

Figure 9:
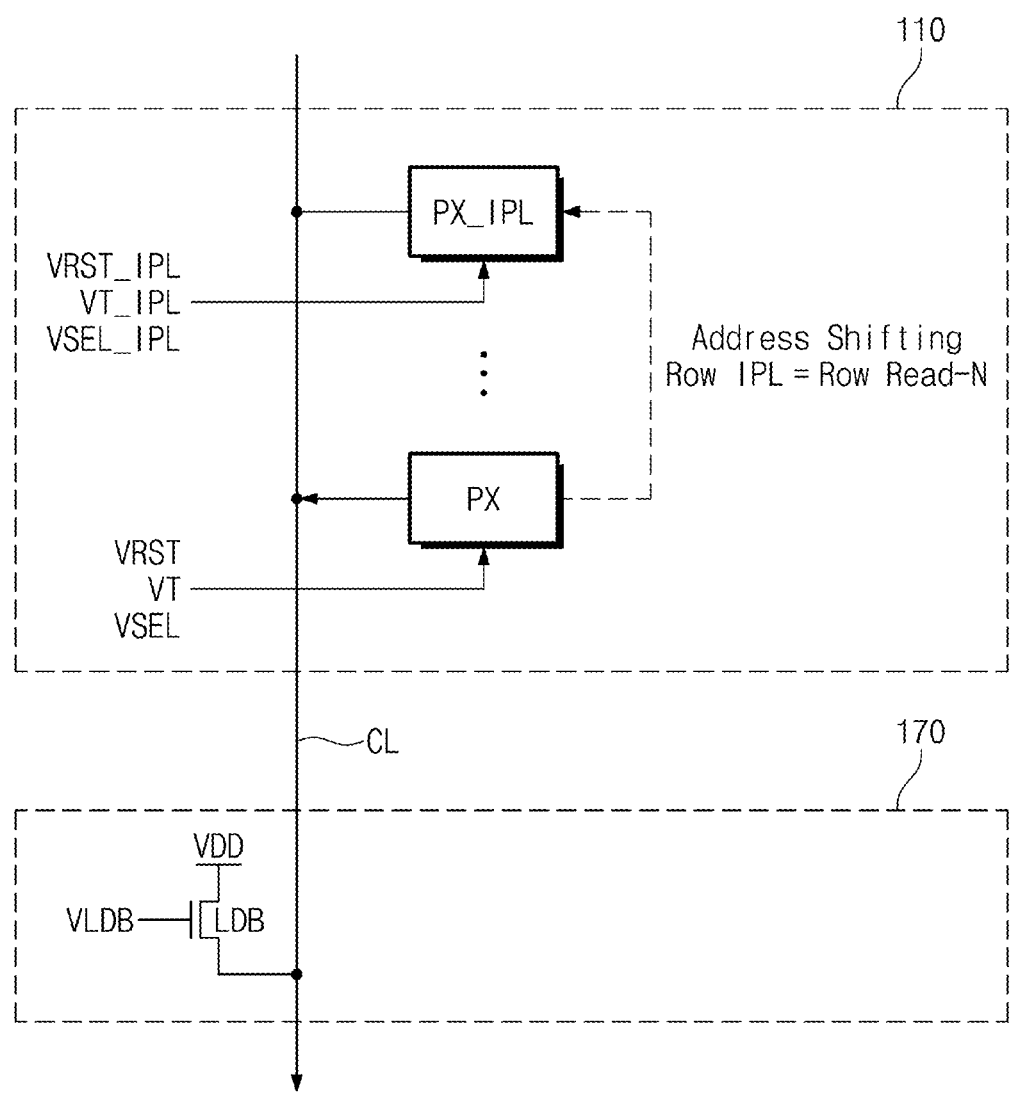
FIG. 9 illustrates an example of a column line voltage control operation according to another embodiment of the present disclosure.

FIG. 9 is a diagram describing an operation of a column line voltage control operation according to another embodiment of the present disclosure. FIG. 9 will be described with reference to FIGS. 1 to 7. In an embodiment, the image sensor device 100 may include the pixel array 110 and the line disconnection circuit 170.

In an embodiment, the image sensor device 100 may use both the method in which the voltage of the column line CL is adjusted by the line disconnection circuit 170 and the method in which the voltage of the column line CL is adjusted by the IPL operation.

The pixel array 110 may include the plurality of pixels PX and PX_IPL. As described with reference to FIG. 6, the pixel PX may perform the readout operation, the shutter operation, and the reset operation based on the reset signal VRST, the selection signal VSEL, and the transfer signal VT.

The IPL pixel PX_IPL may adjust the voltage of the column line CL based on the IPL reset signal VRST_IPL, the IPL transfer signal VT_IPL, and the IPL selection signal VSEL_IPL. In detail, the IPL pixel PX_IPL may adjust the voltage of the column line CL before the select transistor SEL of the pixel PX is turned on. The voltage of the column lines CL adjusted by the IPL operation may be determined based on the voltage of the floating diffusion node FD which has been reset of the IPL pixel PX_IPL.

The line disconnection circuit 170 may include the line disconnection transistor LDB. The line disconnection transistor LDB may be connected between the power supply voltage VDD and the column line CL. When the select transistors SEL of the pixel PX is turned off, the line disconnection transistor LDB may be turned on based on the line disconnection control signal VLDB. As such, the line disconnection circuit 170 may prevent the column line CL from being floated while the select transistor SEL of the pixel PX is turned off.

In another embodiment, the image sensor device 100 may selectively perform the method in which the voltage of the column line CL is adjusted by the line disconnection circuit 170 and the method in which the voltage of the column line CL is adjusted by the IPL operation. For example, a register that is capable of enabling one of the two methods described above may be set by the timing controller 160 (refer to FIG. 1).

Figure 10:
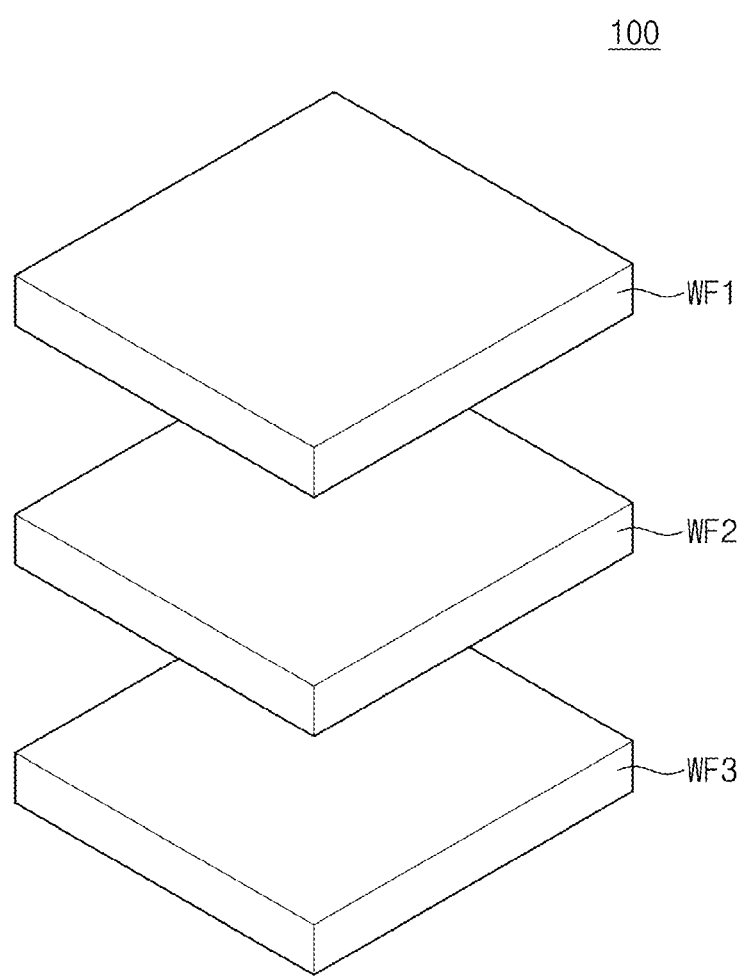
FIG. 10 illustrates an example of a stack-type structure of an image sensor device of FIG. 1.

FIG. 10 illustrates an example of a stack-type structure of an image sensor device of FIG. 1. Referring to FIG. 10, the image sensor device 100 may include first to third chips WF1 to WF3. Each of the first to third chips WF1 to WF3 may be formed in an independent semiconductor wafer. The first chip WF1 may be stacked on the second chip WF2, and the second chip WF2 may be stacked on the third chip WF3. The first to third chips WF1 to WF3 may be electrically connected to each other by using various coupling methods such as a bonding method and a through silicon via (TSV) method.

Referring to FIGS. 1, 9, and 10, the first to third chips WF1 to WF3 may include various components of the image sensor device 100 (e.g., may include the pixel array 110, the row driver 120, the ramp generator 130, the analog-to-digital converter 140, the output circuit 150, the timing controller 160, the line disconnection circuit 170 (refer to FIG. 9), etc.

For example, the first chip WF1 may include the pixel array 110, and the second chip WF2 may include the remaining components other than the pixel array 110. However, the present disclosure is not limited thereto. For example, the components of the image sensor device 100 may be distributed and disposed in the first to third chips WF1 to WF3 in various shapes depending on the way to implement.

For example, when the image sensor device 100 includes the line disconnection circuit 170 of FIG. 4, the first chip WF1 may include the pixel array 110, and the second chip WF2 may include the line disconnection circuit 170. For example, the process of manufacturing the pixel array 110 may be different from the process of manufacturing the line disconnection circuit 170.

Figure 11:
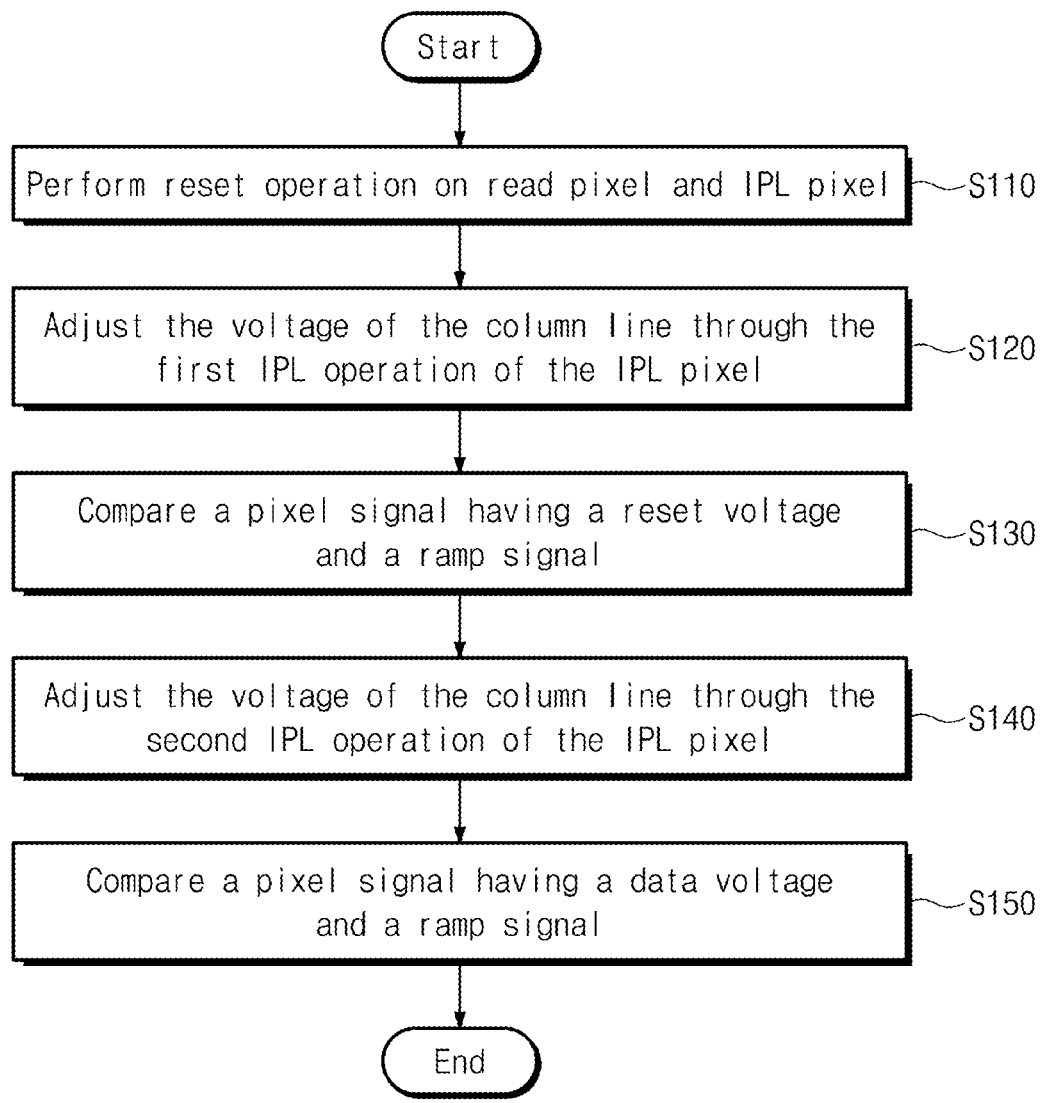
FIG. 11 is a flowchart illustrating an example of an operation method of an image sensor device according to an embodiment of the present disclosure.

FIG. 11 is a flowchart illustrating an example of an operation method of an image sensor device according to an embodiment of the present disclosure. Below, FIG. 11 will be described with reference to FIGS. 1, 4, 7, and 8.

In operation S110, the image sensor device 100 may turn on the reset transistor RST of the pixel PX where the readout operation is performed and the reset transistor RST of the IPL pixel PX_IPL where the IPL operation is performed. As such, the floating diffusion nodes FD of the pixel PX and the IPL pixel PX_IPL may be reset.

In operation S120, the image sensor device 100 may turn off the reset transistor RST of the IPL pixel PX_IPL where the IPL operation is performed and may turn on the select transistor SEL thereof. That is, the IPL pixel PX_IPL may perform the IPL operation. In the IPL operation, the IPL pixel PX_IPL may adjust the voltage of the column line CL. The voltage of the column lines CL may be adjusted based on the voltage of the floating diffusion node FD which has been reset of the IPL pixel PX_IPL.

In operation S130, after turning off the select transistor SEL of the IPL pixel PX_IPL where the IPL operation is performed and turning on the select transistor SEL of the pixel PX where the readout operation is performed, the image sensor device 100 may compare the ramp signal RAMP with the pixel signal PIX having the reset voltage Vr.

In operation S140, the image sensor device 100 may turn off the select transistor SEL of the pixel PX where the readout operation is performed, may turn on the transfer transistor TX of the pixel PX where the readout operation is performed, and may turn on the select transistor SEL of the IPL pixel PX_IPL where the IPL operation is performed. As such, the pixel PX where the readout operation is performed may perform the shutter operation, and the IPL pixel PX_IPL where the IPL operation is performed may adjust the voltage of the column line CL through the IPL operation.

In operation S150, after turning off the select transistor SEL of the IPL pixel PX_IPL where the IPL operation is performed and turning on the select transistor SEL of the pixel PX where the readout operation is performed, the image sensor device 100 may compare the ramp signal RAMP with the pixel signal PIX having the data voltage.

According to an embodiment of the present disclosure, in a period where a select transistor of a pixel where the readout operation is performed is turned off, a voltage of a column line may be adjusted by a specific pixel where the readout operation is not performed. In this case, when correlated double sampling (CDS) is performed, a settling time may decrease.

Accordingly, the accuracy of correlated double sampling (CDS) for each column line may be improved, and a dynamic range of an image sensor may be prevented from decreasing. Also, a speed at which a pixel signal is output may be improved.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image sensor device, comprising:
   a first pixel located at a first row and comprising a first select transistor;
   a second pixel located at a second row and comprising a second select transistor, the second row being different from the first row; and
   a column line connected to the first pixel and the second pixel,
   wherein, during a first time period, a floating diffusion node of the first pixel is reset, during a second time period, the second select transistor is turned on, and a first voltage is applied to the column line through the second select transistor, the second time period being included in the first time period, the first voltage being determined based on a voltage of a floating diffusion node which has been reset of the second pixel.

2. The image sensor device as claimed in claim 1, wherein:
   the first pixel generates a first pixel signal based on a first control signal,
   the second pixel generates a second pixel signal based on a second control signal,
   the second pixel signal is generated before the first pixel signal is generated, and
   the first select transistor is turned on during the first time period.

3. The image sensor device as claimed in claim 2, wherein the first pixel further includes a first reset transistor, and the first reset transistor is turned on during the first time period.

4. The image sensor device as claimed in claim 3, wherein the second pixel further includes a second reset transistor, and during a third time period included in the first time period and advanced with respect to the second time period, the second reset transistor is turned on, and the floating diffusion node of the second pixel is reset.

5. The image sensor device as claimed in claim 2, further comprising:
   a row driver configured to generate control signals including the first control signal and the second control signal and to provide the control signals to the first pixel and the second pixel; and
   a timing controller configured to control the row driver, an address of the second row being determined based on an address of the first row.

6. The image sensor device as claimed in claim 5, wherein the row driver includes:
   a first latch circuit configured to receive the address of the first row from the timing controller;
   a second latch circuit configured to receive the address of the second row from the timing controller; and
   logic circuits configured to receive the address of the first row and the address of the second row from the first latch circuit and the second latch circuit, respectively, and to transmit the control signals to the first pixel and the second pixel.

7. The image sensor device as claimed in claim 6, wherein the timing controller includes an address shifter configured to generate the address of the second row by shifting the address of the first row.

8. The image sensor device as claimed in claim 7, wherein:
the logic circuits include a selection logic circuit configured to output a first selection signal to the first select transistor in response to the address of the first row and to output a second selection signal to the second select transistor in response to the address of the second row,
the first select transistor is turned on or turned off in response to the first selection signal, and
the second select transistor is turned on or turned off in response to the second selection signal.

9. The image sensor device as claimed in claim 5, further comprising:
a first chip to which a first process is applied; and
a second chip to which a second process different from the first process is applied, wherein the first chip and the second chip are vertically stacked and are electrically connected to each other, the first chip including the first pixel and the second pixel, and the second chip including the row driver and the timing controller.

10. The image sensor device as claimed in claim 4, wherein:
the first pixel further includes a first photoelectric conversion element, and during a fourth time period, charges generated by the first photoelectric conversion element are transferred to the floating diffusion node of the first pixel, and the second pixel applies the first voltage to the column line.

11. The image sensor device as claimed in claim 10, wherein:
the second pixel further includes a second photoelectric conversion element, and
the second photoelectric conversion element generates charges prior to the first photoelectric conversion element so as to be transferred to the floating diffusion node of the second pixel.

12. An image sensor device, comprising:
a pixel array including:
a first pixel located at a first row and including a first reset transistor and a first select transistor, and
a second pixel located at a second row different from the first row and including a second select transistor;
a column line connected to both the first pixel and the second pixel;
a row driver configured to generate control signals controlling each of the first and second rows of the pixel array respectively so as to be provided to the first pixel and the second pixel; and
a timing controller configured to control the row driver, wherein during a first time period, based on the control signals, the first reset transistor is turned on, and the first select transistor is turned off, during a second time period included in the first time period, based on the control signals, the second select transistor is turned on, a first voltage is applied to the column line through the second select transistor, and the first voltage is determined based on a voltage of a floating diffusion node which has been reset of the second pixel.

13. The image sensor device as claimed in claim 12, wherein the first pixel further includes a first photoelectric conversion element, and during a third time period, based on the control signals, the first select transistor is turned off, the second select transistor is turned on, charges generated by the first photoelectric conversion element are transferred to a floating diffusion node of the first pixel, and the first voltage is applied to the column line through the second select transistor.

14. The image sensor device as claimed in claim 13, further comprising:
a line disconnection transistor connected to the column line, wherein, when the first select transistor is turned on, the line disconnection transistor are turned off, and when the first select transistor is turned off, the line disconnection transistor are turned on such that a voltage level of the column line is adjusted to a second voltage.

15. The image sensor device as claimed in claim 14, wherein the row driver includes:
a first latch circuit configured to receive an address of the first row from the timing controller;
a second latch circuit configured to receive an address of the second row from the timing controller; and
logic circuits configured to receive the address of the first row and the address of the second row from the first latch circuit and the second latch circuit, respectively, and to transmit the control signals to the first pixel and the second pixel.

16. The image sensor device as claimed in claim 15, wherein the timing controller includes an address shifter configured to generate the address of the second row by shifting the address of the first row.

17. The image sensor device as claimed in claim 16, further comprising:
a first chip to which a first process is applied; and
a second chip to which a second process different from the first process is applied, the first chip and the second chip being vertically stacked and electrically connected to each other, the first chip including the pixel array, and the second chip including the row driver, the timing controller, and the line disconnection transistor.

18. An operation method of an image sensor device, the method comprising:
turning on a first reset transistor of a first pixel located at a first row and a second reset transistor of a second pixel located at a second row such that a floating diffusion node of the first pixel and a floating diffusion node of the second pixel are reset;
applying a first voltage to a column line, which are connected to both the first pixel and the second pixel, through a second select transistor by turning off the second reset transistor and turning on the second select transistor; and
comparing a first pixel signal output from the first pixel with a ramp signal after turning off the second select transistor and turning on a first select transistor, wherein the first voltage is determined based on a voltage of the floating diffusion node which has been reset of the second pixel.

19. The method as claimed in claim 18, wherein an address of the second row is determined based on an address of the first row.

20. The method as claimed in claim 18, further comprising:
applying the first voltage to the column line by turning off the first select transistor, turning on a transfer transistor of the first pixel, and turning on the second select transistor; and comparing a second pixel signal output from the first pixel with the ramp signal after turning on the first select transistor and turning off the transfer transistor.

* * * * *